(12) United States Patent
Thybo et al.

(10) Patent No.: US 10,619,757 B2
(45) Date of Patent: Apr. 14, 2020

(54) VALVE AND A METHOD OF CONTROLLING A VALVE IN A FLUID CONDUIT

(71) Applicant: IMI HYDRONIC ENGINEERING INTERNATIONAL SA, Eysins (CH)

(72) Inventors: Claus Thybo, Sonderborg (DK); Slavko Lah, Brezice (SI); Gregor Bozic, Krsko (SI); Peter Volovec, Kapele (SI)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 40 days.

(21) Appl. No.: 15/105,252

(22) PCT Filed: Dec. 17, 2014

(86) PCT No.: PCT/EP2014/078302
§ 371 (c)(1),
(2) Date: Jun. 16, 2016

(87) PCT Pub. No.: WO2015/091691
PCT Pub. Date: Jun. 25, 2015

(65) Prior Publication Data
US 2016/0312913 A1    Oct. 27, 2016

(30) Foreign Application Priority Data

Dec. 20, 2013 (EP) .................................... 13199060

(51) Int. Cl.
*F16K 31/00* (2006.01)
*F16K 31/124* (2006.01)
(Continued)

(52) U.S. Cl.
CPC ............ *F16K 31/1245* (2013.01); *F16K 1/12* (2013.01); *F16K 31/1262* (2013.01);
(Continued)

(58) Field of Classification Search
CPC ....... Y10T 137/7761; Y10T 137/86879; Y10T 137/7762–777
(Continued)

(56) References Cited

U.S. PATENT DOCUMENTS 1,850,094 A * 3/1932 Payne .................. F16K 39/028
137/242
2,412,490 A * 12/1946 Biggle .................. F16K 31/385
137/487.5
(Continued)

FOREIGN PATENT DOCUMENTS

CN      2422491 Y    3/2001
CN    201129513 Y   10/2008
(Continued)

OTHER PUBLICATIONS

Office Action dated Sep. 5, 2017, by the State Intellectual Property Office (SIPO) of the People's Republic of China in corresponding Chinese Patent Application No. 201480068263.4 (8 pages).
(Continued)

*Primary Examiner* — Robert K Arundale
(74) *Attorney, Agent, or Firm* — Buchanan Ingersoll & Rooney P.C.

(57) ABSTRACT

The present invention relates to a valve having a control function and a method for controlling a valve in a fluid conduit in order to adapt flow rates and/or differential pressure rates. The valve comprises a fluid inlet and a fluid outlet and a valve closing member located inside a valve body. The valve closing member is operationally connected to a variable volume chamber, which is adapted to extract energy from the fluid in order to provide either an opening or a closing displacement of the valve closing member such that the degree of opening of the valve can be changed. The
(Continued)

supply of fluid to and from the variable volume chambers may be regulated by electronically controlled valves.

10 Claims, 7 Drawing Sheets

(51) Int. Cl.
*F16K 31/126* (2006.01)
*F16K 31/163* (2006.01)
*F16K 31/54* (2006.01)
*F16K 1/12* (2006.01)
*G05D 7/00* (2006.01)

(52) U.S. Cl.
CPC ........ *F16K 31/1266* (2013.01); *F16K 31/163* (2013.01); *F16K 31/54* (2013.01); *G05D 7/005* (2013.01)

(58) Field of Classification Search
USPC ................. 251/4, 31, 61, 62, 305–308, 279, 251/298–303
See application file for complete search history.

(56) References Cited

U.S. PATENT DOCUMENTS

| | | | |
|---|---|---|---|
| 2,435,968 A | 2/1948 | Kalix | |
| 3,225,785 A * | 12/1965 | Goike | F22D 5/26 137/486 |
| 3,253,611 A * | 5/1966 | Cummins | F17C 13/028 137/338 |
| 3,658,293 A * | 4/1972 | Gaebel | F16K 1/24 251/228 |
| 3,769,998 A | 11/1973 | Avant | |
| 3,804,124 A * | 4/1974 | Finke | F16K 1/24 137/630.14 |
| 4,241,898 A * | 12/1980 | Segrest | B63C 11/12 137/543.15 |
| 4,561,471 A * | 12/1985 | Diaz | F16K 11/0655 137/315.03 |
| 6,286,307 B1 * | 9/2001 | Feeny | F01N 13/087 123/323 |
| 6,305,401 B1 * | 10/2001 | Uehara | G05D 16/2093 137/102 |
| 2003/0145603 A1 | 8/2003 | Reed et al. | |
| 2003/0233203 A1 * | 12/2003 | Grumstrup | G01F 1/24 702/98 |
| 2005/0155651 A1 * | 7/2005 | Law | G05D 16/2093 137/487.5 |
| 2006/0102232 A1 * | 5/2006 | Plevich | F15B 15/10 137/488 |
| 2007/0191989 A1 * | 8/2007 | Esposito | G05B 19/0425 700/282 |
| 2008/0023662 A1 * | 1/2008 | Reinicke | F16K 15/183 251/58 |
| 2009/0314364 A1 | 12/2009 | Kesner et al. | |
| 2010/0301238 A1 | 12/2010 | Krake et al. | |

FOREIGN PATENT DOCUMENTS

| | | |
|---|---|---|
| CN | 103174868 A | 6/2013 |
| JP | 2004278563 A | 10/2004 |
| WO | WO 2004/042262 A1 | 5/2004 |

OTHER PUBLICATIONS

Office Action dated Dec. 30, 2016, by the Chinese Patent Office in corresponding Chinese Patent Application No. 201480068263.4. (8 pages).
International Search Report (PCT/ISA/210) dated May 15, 2015, by the European Patent Office as the International Searching Authority for International Application No. PCT/EP2014/078300.
Written Opinion (PCT/ISA/237) dated May 15, 2015, by the European Patent Office as the International Searching Authority for International Application No. PCT/EP2014/078300.
Office Action (Decision of Rejection) dated Jun. 4, 2019, by the State Intellectual Property Office of the People's Republic of China in corresponding Chinese Patent Application No. 20148006826.4, with partial English-language summary (12 pages).
Office Action (Communication pursuant to Article 94(3) EPC) dated Aug. 23, 2019, by the European Patent Office in corresponding European Application No. 14 821 597.3-1204. (5 pages).
Office Action (The Third Office Action) dated Feb. 22, 2019, by the State Intellectual Property Office of the People's Republic of China in corresponding Chinese Patent Application No. 201480068263.4, and an English Translation of the Office Action. (25 pages).

* cited by examiner

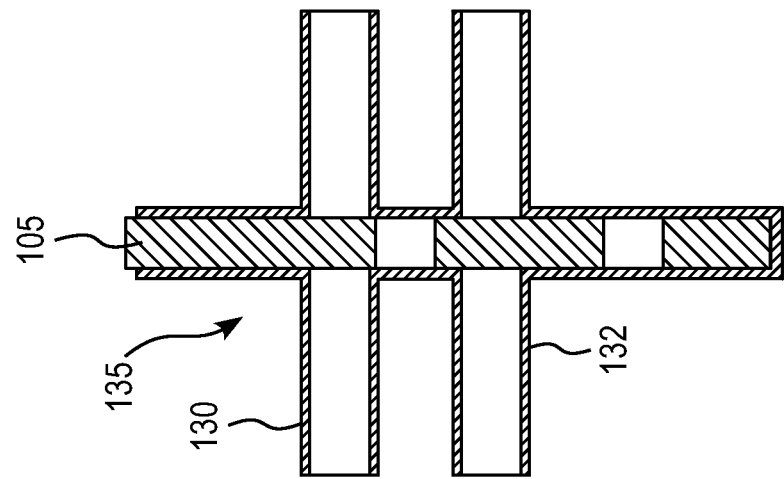
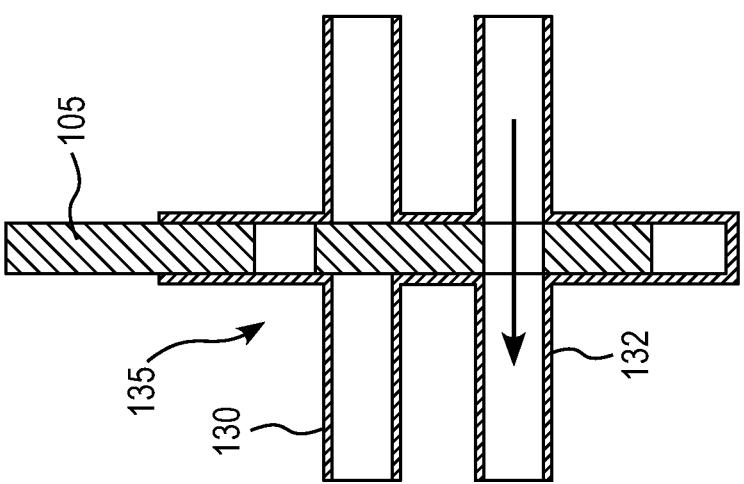
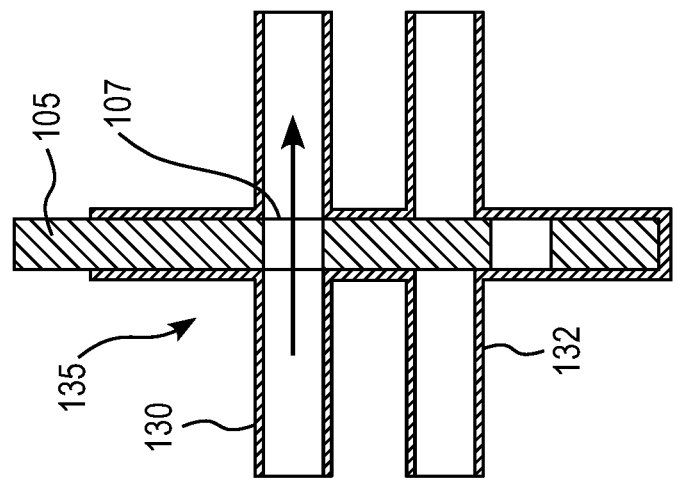

VALVE AND A METHOD OF CONTROLLING A VALVE IN A FLUID CONDUIT

FIELD OF THE INVENTION

The present invention relates to a valve for regulating fluid flow and/or pressure in fluid conduits. The fluid conduits can be designed for e.g. heating, cooling, water supply or industrial manufacturing processes. The invention also relates to a method of controlling a valve in a fluid conduit.

BACKGROUND ART

Fluid distribution systems are designed to feed a fluid from a source to a consumption point. Each consumption point typically has a calculated and designed optimal flow or differential pressure requirement. However, depending on the type of hydronic system, the flow requirement is often variable over time and can change with factors like seasonality (e.g. summer or winter) and daily weather conditions. Specifically, the seasonality effect can lead to changes in the load at the consumption points, and may be due to factors like temperature changes in the system fluid (e.g. for heating systems), changes in demand for the system fluid (e.g. for drinking water).

Control valves are frequently used in fluid distribution systems and have a variable opening such that the flow rate can be adjusted. Specifically, control valves are provided with a moveable valve closing member inside a valve body. The opening and the closing function of the control valve can be regulated based on command signals from a thermostatic device, a sensor or a Building Management System (BMS) or the like.

The movement of a valve closing member in control valves can be operated by a pilot actuator. The pilot actuator is adapted to provide a force that can move a valve closing member inside the valve body in order to open and close the valve. A typical pilot actuator design consists of a membrane-sealed chamber, a pre-stressed spring and a fluid connection to an upstream side of the valve body. The valve closing member is retained by the force of a pre-stressed pilot spring which is typically set so that the spring urges the pilot to keep the valve open and enable a flow there through. The membrane is operationally connected to the valve closing member through a connection rod. Depending on the particular implementation, the pilot actuator and some of its components (e.g. bottom and upper chambers, disc, membrane ring, membrane, safety spring and main axis) may be quite bulky.

The pilot actuator can be used for regulating flow in both small and large fluid conduits. However, for large valves the pilot actuator needs to be of a significant size in order to provide a sufficient opening/closing force in large fluid conduits with high flow rates.

SUMMARY OF THE INVENTION

An object of the present invention is to alleviate the drawbacks of the prior art. This and other objects, which will become apparent in the following, are accomplished by a valve and a method as defined in the accompanying independent claims.

According to a first aspect of the present invention, there is provided a valve (or valve device) having a control function for regulating flow and/or pressure in a fluid conduit, the valve comprising:

a fluid inlet and a fluid outlet, a valve closing member for regulating the flow from the inlet to the outlet, the valve closing member being movable between a closed position and an opened position, the valve having a high pressure side upstream of the valve closing member and a low pressure side downstream of the valve closing member, a variable volume chamber being operatively connected to the valve closing member, such that a change of volume of the chamber causes a change in position of the valve closing member, a first controllable conduit enabling said high pressure side to be in fluid communication with the variable volume chamber, a second controllable conduit enabling the low pressure side to be in fluid communication with said variable volume chamber, and a control unit for controlling the opening and closing of said first and second controllable conduits to change the volume of said variable volume chamber.

The present invention is based on the realization that the difference in pressure over the valve can be used for regulating the volume of a variable volume chamber. In particular, by arranging controllable circuits, the supply of fluid to and from the variable volume chamber can be regulated such that a variable opening degree of the main valve is achieved so that the flow rates can be adjusted in a precise manner. This setup of the variable volume chamber is more or less independent of the size of the valve. Thus, advantages include less wear, less maintenance and a space saving in comparison with today's solution.

The valve may be installed on a supply pipe to the consumption point or consumption element (e.g. a radiator), or it may be installed on a return pipe from the consumption point. In the first case, the high pressure will be upstream of the valve and the low pressure will be downstream of the valve. In the second case the low pressure will be upstream of the valve and the high pressure will be downstream. For simplicity, in the following description it will be assumed that the valve is on a supply pipe. Thus, in the following, the high pressure side is the upstream side of the valve body and is thus, generally, closer to the source. Correspondingly, the low pressure side is the downstream side of the valve body and is thus, generally, closer to a consumption point. The limit between the high pressure side and the low pressure side is defined by the position of a seat, against which the moveable valve closing member abuts when the valve is closed. Additionally, the appellations "high pressure" and "low pressure" should be interpreted as relative values in respect to each other.

The valve normally has a valve body which defines the fluid inlet and the fluid outlet of the valve. The valve closing member is a movable part within the valve body. The valve closing member regulates the flow from the the fluid inlet of the valve body to the fluid outlet of the valve body. In the open position of valve closing member fluid can pass from the fluid inlet, along the valve closing member, to the fluid outlet of the valve body. In the closed position of the valve closing member, fluid is prevented from passing from the fluid inlet, along the valve closing member, to the fluid outlet of the valve body. The valve closing member may, for instance, be embodied as a plug or a cone which can mate with a seat for obtaining the closed position of the valve closing member. The valve closing member may, for instance, be movable in linear direction or in a rotational direction. For instance, the valve closing member may be a rotatable member having a through passage which may be shielded by an outer shield in a closed position of the valve closing member and non-shielded or partly shielded in an open position of the valve closing member.

The valve is suitably adapted to transfer fluid from said high pressure side, via said first controllable conduit, to said variable volume chamber, and to transfer fluid from said low pressure side, via said second controllable conduit, to said variable volume chamber.

As will be explained in connection with the description of the drawings, in at least some embodiments, transferring fluid from the high pressure side to the variable volume chamber causes the valve closing member to move in a closing direction. Transferring fluid from the low pressure side would thus cause the valve closing member to move in the opening direction.

In at least some other embodiments, transferring fluid from the high pressure side to the variable volume chamber causes the valve closing member to move in an opening direction. Transferring fluid from the low pressure side would thus cause the valve closing member to move in the closing direction.

According to an exemplary embodiment, the valve closing member is subject to a biasing force towards the closed position or towards the opened position, wherein either an increase or a decrease in volume of the variable volume chamber counteracts the biasing force.

The biasing force is providing a force in an opposite direction of the force from the increase or decrease in volume in the variable volume chamber, such that a reciprocating motion of the valve closing member is achieved and the valve closing member can be urged to either an opened or to a closed position.

According to an exemplary embodiment, the valve closing member is axially movable between a closed position and an opened position. For instance, the valve closing member may be attached or comprise a valve stem.

According to an exemplary embodiment, the valve closing member is rotationally movable between a closed position and an opened position. Examples of valves including rotating valve closing members are ball valves and butterfly valves.

An axial or a rotational movement of the valve closing member changes the degree of opening of the valve and regulates the flow through the valve body and/or the differential pressure across the valve.

According to an exemplary embodiment, the variable volume chamber is partly defined by a moveable separating member, such as a membrane, diaphragm or piston, wherein the separating member is connected to the valve closing member.

The moveable separating member can be fixedly attached to the remaining surface that encloses the variable volume chamber.

Alternatively, the surface can be arranged as two parts sliding into each other and with a sealed joint in-between the parts. The seal prevents fluid leakage and loss of pressure inside the variable volume chamber.

According to an exemplary embodiment, the separating member separates the variable volume chamber from a compartment, the variable volume chamber being connected to the high pressure side and the low pressure side of the valve and the compartment being provided with a pressure relief, for instance, connected to the low pressure side of the valve. A pressure relief may, for instance, be useful for avoiding expansion of the chamber due to freezing, or to avoid overheating.

According to an exemplary embodiment, the control unit is operatively connected to, or comprises an electronically controlled valve device, such as a solenoid valve device, for selectively and separately opening the first and second controllable conduits. However, rather than a solenoid valve device, it may be any appropriate type of on-off or even modulating valve device.

An advantage with an electronically controlled valve is that it enables a precise control of the fluid volume inside the variable volume chamber. According to an exemplary embodiment, the electronically controlled valve device comprises a glider with two openings, such that a displacement of the glider is adapted to open one of the controllable conduits at a time. A glider with two openings provides an advantage in that a single electronically controlled valve unit can handle both the supply and the discharge function of fluid from the variable volume chamber.

According to an exemplary embodiment, the electronically controlled valve comprises a glider with two openings, such that displacement of the glider is an axial displacement. The glider provides three possible settings; open supply conduit to variable volume chamber, open discharge conduit from the variable volume chamber and closing both the supply and the discharge conduits in an intermediate position.

It should be understood that the electronically controlled valve may comprise other mechanisms than the above mentioned glider. For instance, according to an exemplary embodiment, the electronically controlled valve comprises a rotating disc to open/close the conduits. For instance, the rotating disc may have one or more openings which may be aligned with the conduits for opening, and displaced relative to the conduits for closing. Various types of sector principles are also conceivable to use.

According to an exemplary embodiment, the control unit is adapted to receive an input signal from a Building Management System (BMS), to translate the signal into a required opening of the electronically controlled valve device, and to actuate a displacement of the electronically controlled valve device. A connection between the valve and a BMS enables an automatic regulation of the flow through the valve.

According to an exemplary embodiment, the valve further comprises means for determining an actual position of the valve closing member, and to provide data on the actual position as input to the control unit or the BMS. By providing the valve with means for determining the actual position of the valve closing member, a better accuracy can be achieved in the determination of the actual flow through the valve.

Although electronically controlled valve devices have been described above, it should be understood that in other embodiments the valves may be controlled in other ways. For instance, instead of electronically controlled valves, there may be provided mechanically, pneumatically or hydraulically controlled valve devices.

According to an exemplary embodiment, the position measurement device includes a sensor and a position indicator such as a magnet or a RFID device. A magnet provides a simple and reliable mechanical sensing device, while a RFID device can be used if there is a need to transfer information about the valve closing member in a wireless manner.

According to an exemplary embodiment, the valve comprises a valve body in which said valve closing member is movable, wherein said variable volume chamber is located outside the valve body. By arranging the variable volume chamber outside the valve body, the actuator can be designed as a separate external part. A separate part can provide advantages such as ease of maintenance and repairs. The actuator can be removed without dismounting the valve body from the fluid conduits.

According to an exemplary embodiment, the valve is comprising a valve body in which the valve closing member is movable, wherein the variable volume chamber is located inside the valve body. An integrated pilot actuator and valve provide the advantage of a simplified installation process, as there is no need to install a separate actuator.

According to an exemplary embodiment, the variable volume chamber is located inside the valve closing member. By arranging the variable volume chamber inside the closing member, the size of the internal chamber inside the valve body is efficiently utilized with less added extra volume to accommodate the variable volume chamber.

According to an exemplary embodiment, the first and second controllable conduits are formed as channels inside the valve body. By casting the controllable conduits inside the valve body, they can be durably designed, without external hoses.

According to a second aspect of the present invention in accordance with the first aspect thereof, it relates to a method for controlling a valve in a fluid conduit, wherein the valve comprises a valve closing member for regulating the valve comprises a valve closing member for regulating the flow from an inlet to an outlet, the valve closing member being movable between a closed position and an opened position, the control valve having a high pressure side on one side of the valve closing member and a low pressure side an opposite of the valve closing member, the method comprising the steps of:

diverting an amount of fluid from the high pressure side or returning to the low pressure side an amount of fluid which has previously been diverted from the high pressure side, utilizing the potential energy of the diverting fluid or the potential energy of the returning fluid to move the valve closing member.

According to at least one exemplary embodiment, the valve closing member is movable in a closing direction and in an opening direction, the method comprising:

diverting an amount of fluid from the high pressure side for moving the valve closing member in one of said directions, and/or returning an amount of fluid to the low pressure side for moving the valve closing member in the other one of said directions. Said directions may, for instance, be linear or rotary directions.

According to an exemplary embodiment, the method is further comprising the step of operating a modulating valve device, such as an on-off valve device, for selectively diverting or returning the amount of fluid.

According to an exemplary embodiment, the method is further comprising the steps of:

determining a desired position of the valve closing member, determining an actual position of the valve closing member, performing a continuous feedback loop in order to compare the actual position to the desired position and to quantify the deviation between the actual position and the desired position, and performing an iterative correction of the position of the valve closing member such that the deviation decreases.

BRIEF DESCRIPTION OF THE DRAWINGS

The invention will now be described with reference to the appended drawings, which by way of example illustrate embodiments of the present invention and in which:

FIGS. 3a-3c are schematic cross-sectional views of an electronically controlled valve adapted to regulate controllable conduits.

DETAILED DESCRIPTION

Figure 1:
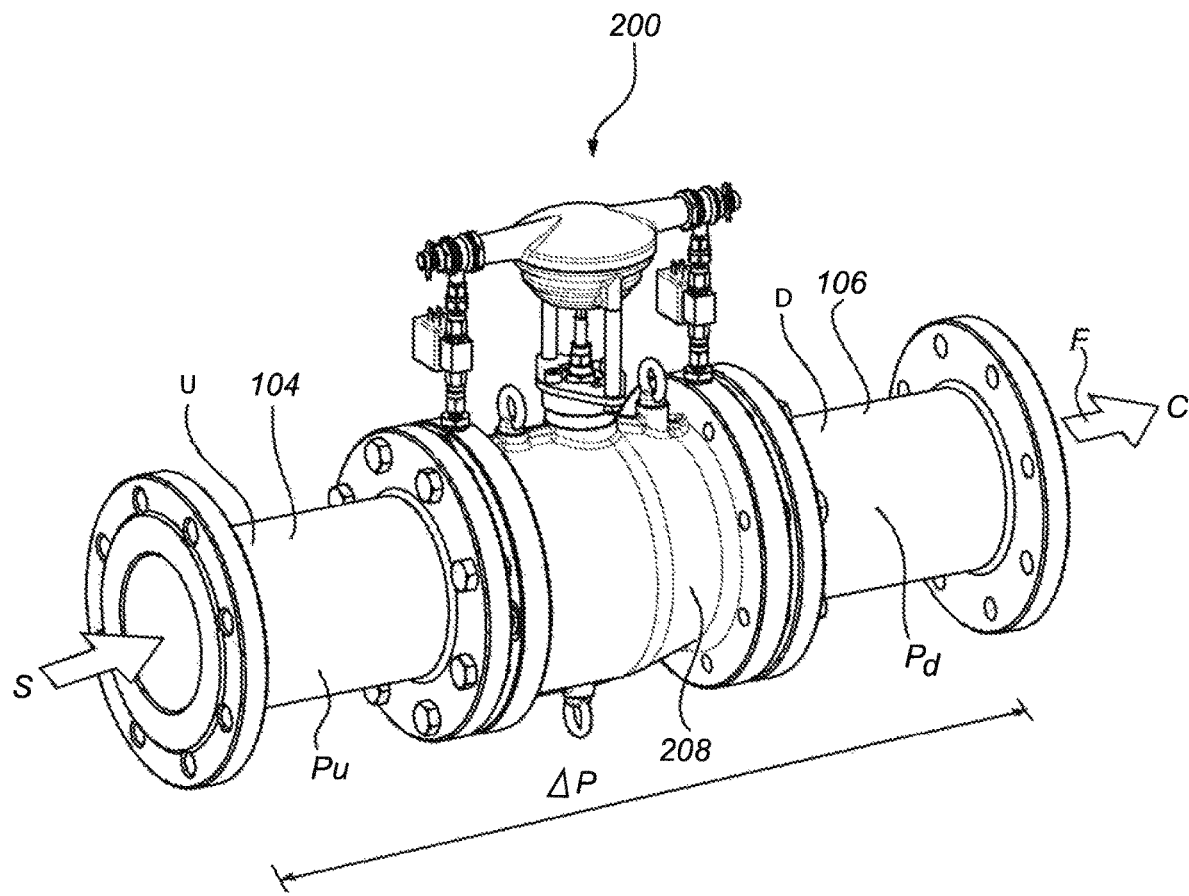
FIG. 1 is a perspective view of the valve according to an exemplary embodiment of the present invention, mounted in a hydronic system.

In the following description, a valve according to exemplary embodiments of the present invention is described in the context of a fluid distribution system. It should be noted that this by no means limits the scope of the present invention, which is equally applicable to other types of industrial applications, such as fluid distribution systems in manufacturing processes (e.g. chemical processes, heating or cooling for process machines, etc.). Additionally, the valve may have a valve body which comprises several fluid inlets and fluid outlets.

Furthermore, in the following drawings it will be assumed that the exemplified valves of the different embodiments are installed on a supply pipe, wherein the high pressure side is upstream of the valve and the low pressure side is downstream of the valve. However, it should be understood that, although not illustrated in the drawings, valves according to embodiments of the invention could be installed on return pipes, in which case the high pressure side would be downstream of the valve, while the low pressure side would be upstream of the valve.

It should also be noted that, according to the illustrated embodiments, the complete valve comprises a number of "sub-valves". For instance, the valve 100 in FIG. 4a comprises sub-valves in the form of a valve closing mechanism 114 with its member 116 and seat 118, and controllable valves 134 and 136. Thus, a complete valve, such as the valve 100, could be referred to as a "valve device" having a number of different valve mechanisms.

As illustrated in FIG. 1, a valve 200 having a control function is mounted in a fluid conduit, between a first 104 and a second conduit section 106. The connection of the valve 200 to the first conduit section 104 presents a fluid inlet to the valve 200, while the connection to the second conduit section 106 presents a fluid outlet from the valve 200. The valve 200 has a valve body 208 which connects with an upstream side U of the fluid conduit and a downstream side D of the fluid conduit. The upstream side U may be connected to a source S, such as a boiler in a heating application or a water supply, whereas the downstream side D is located closer to a consumption point C, such as an air handling unit, heat exchanger, fan-coil unit, radiator or water tap. When there is a flow F of fluid through the valve body 208, the pressure $p_u$ in the upstream side U of the valve body 208 is higher than the pressure $p_d$ in the downstream side D of the valve body 208, leading to a pressure differential $\Delta p$ over the valve 200.

Figure 2:
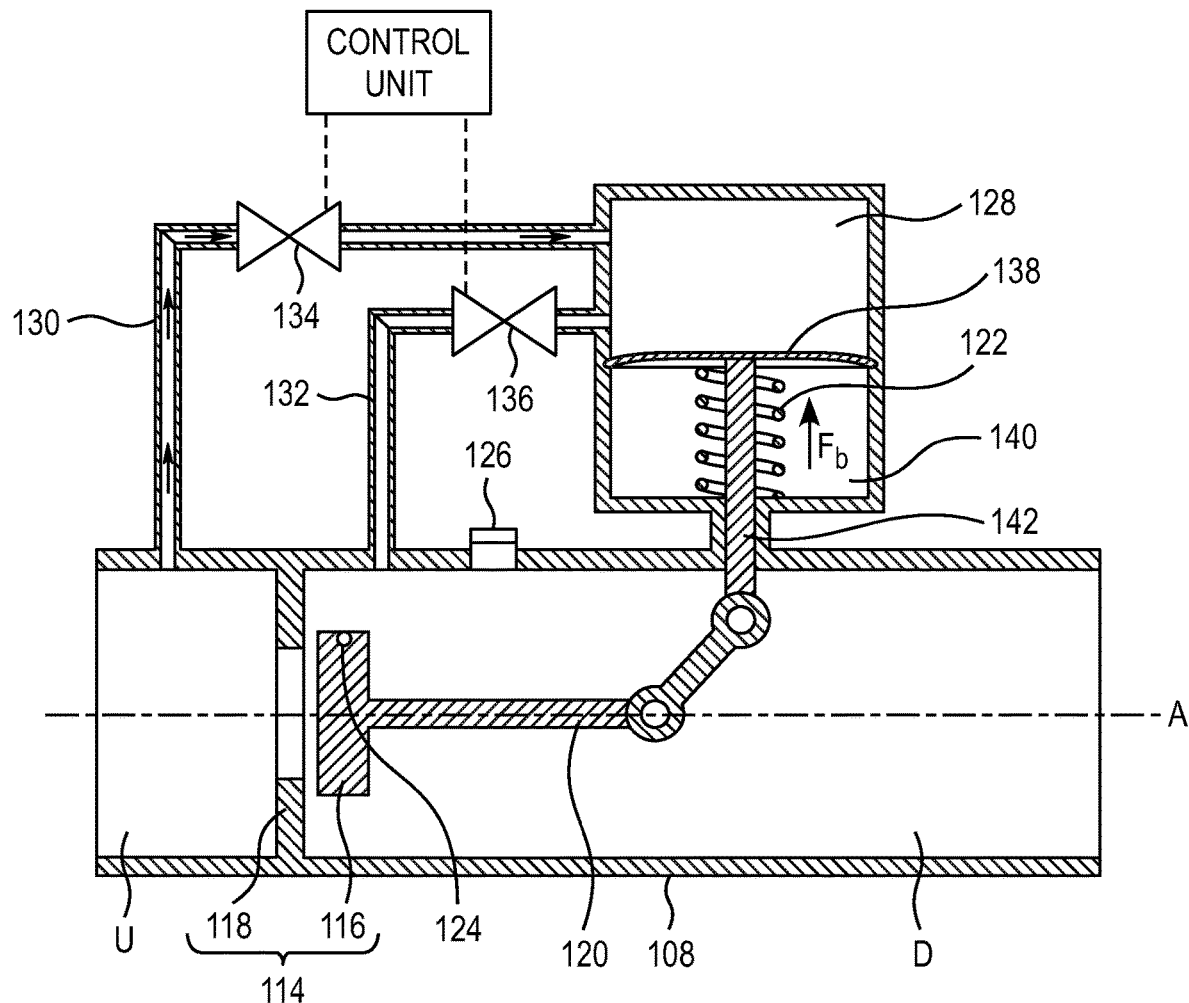
FIG. 2 is a schematic cross-sectional view of a valve according to an exemplary embodiment of the present invention.

Now referring to FIG. 2, showing a schematic cross-sectional view of a valve body 108, in which a valve closing mechanism 114 comprising a valve closing member in the shape of an axially moveable plug 116 and a fixed seat 118 is arranged. The position of the seat 118 defines a limit between the upstream side U (at the fluid inlet) and the downstream side D (at the fluid outlet) of the valve body 108. The plug 116 is connected to a displacement mechanism 120, such as a displaceable rod which is adapted to move the plug in an axial direction A. In the illustrated example, the plug 116 is subject to a biasing force $F_b$ from a spring member 122, to a normally open position. The spring member 122 is pre-stressed such that in a natural state without any other outer influence, the spring member 122 urges the plug 116 away from the seat 118, such that the valve 100 is opened. Additionally, the plug 116 may be provided with a position indicator 124, such as a magnet inside the plug 116, which cooperates with a sensing device 126 inside the valve body 108.

A variable volume chamber 128 is adapted to receive a fluid volume from the upstream side U of the valve body 108 and discharge a fluid volume to the downstream side D of the valve body 108. The supply and discharge of fluid to and from the variable volume chamber 128 is achieved by a first 130 and a second controllable conduit 132, wherein the first controllable conduit 130 is adapted to transfer a fluid volume from the upstream side U of the valve body 108 and the second controllable conduit 130 is adapted to transfer a fluid volume from the variable volume chamber 128 to the downstream side D of the valve body 108. In other words, the first controllable conduit 130 provides a "fill" function of the variable volume chamber 128, whereas the second controllable conduit 132 provides a "drain" function of the variable volume chamber 128.

Furthermore, a first 134 and second electronically controlled valve 136 are arranged on the first 130 and the second controllable conduit 132, respectively, and are adapted to regulate the fluid supply/discharge to and from the variable volume chamber 128. The electronically controlled valves 134, 136 can be of a solenoid type valve, or any appropriate on-off valve device or modulating valve device.

Moreover, as illustrated in FIGS. 3a, 3b and 3c, the conduits 130, 132 can be provided with a common electronically controlled valve 135 with the capability of regulating the supply from the first controllable conduit 130 and the discharge from the second controllable conduit 132. As schematically illustrated in FIGS. 3a-3c, a solenoid valve 135 with a combined function can be adapted to control the fluid volume inside the variable volume chamber 128. The combined function can be achieved with a combined valve 135 which is operationally connected to the first 130 and the second controllable conduit 132. An axially moveable slider 105 with an opening 107 is located inside the housing of the solenoid valve. Three different axial positions of the opening 107 determine the presence and direction of fluid flow to and from the variable volume chamber 128. As illustrated in FIG. 3a, the fluid supply is opened to the variable volume chamber 128 when the opening 107 is aligned with the first controllable conduit 130. As illustrated in FIG. 3b, the fluid discharge from the variable volume chamber 128 is enabled when the opening 107 is aligned with the second controllable conduit 132. Furthermore, as illustrated in FIG. 3c, both the controllable conduits 130, 132 are closed when the solenoid valve is in an intermediate position.

Now referring back to FIG. 2, the variable volume chamber 128 is partly defined by a moveable separating member 138, in shape of a membrane, diaphragm or piston or the like. The variable volume chamber 128 may comprise a single variable volume chamber 128, or can be designed with an additional compartment 140 (as in the illustrated example). The two compartments 128, 140 are separated by the separating member 138. Having two compartments may present one or more of the following advantages: robustness of the design, precaution against injury caused by the spring, protection against insulation, and possibility to have normally opened (NO) or normally closes (NC) pilot actuator.

A mechanical member 142, such as a connecting rod, is operationally connected to the moveable separating member 138. For instance, the mechanical member 142 can be attached to the inner or to the outer side of the moveable separating member 138. The mechanical member 142 is also operationally connected to the axially moveable plug 116. As the volume inside the variable volume chamber 128 changes, the position of the mechanical member 142 and the position of the axially moveable plug 116 are adapted to change accordingly.

Figure 4A:
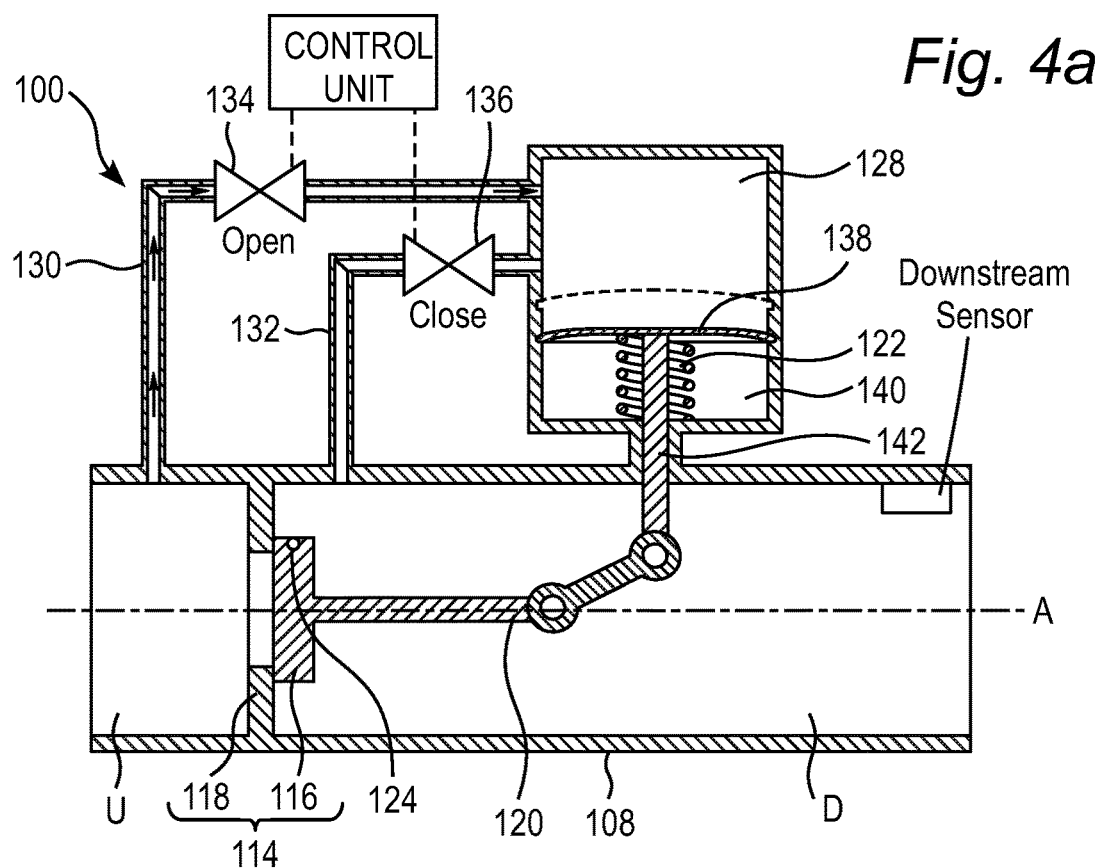
FIGS. 4a and 4b are schematic cross-sectional views of a valve according to an exemplary embodiment of the present invention in a closed and in an opened position.
Figure 4B:
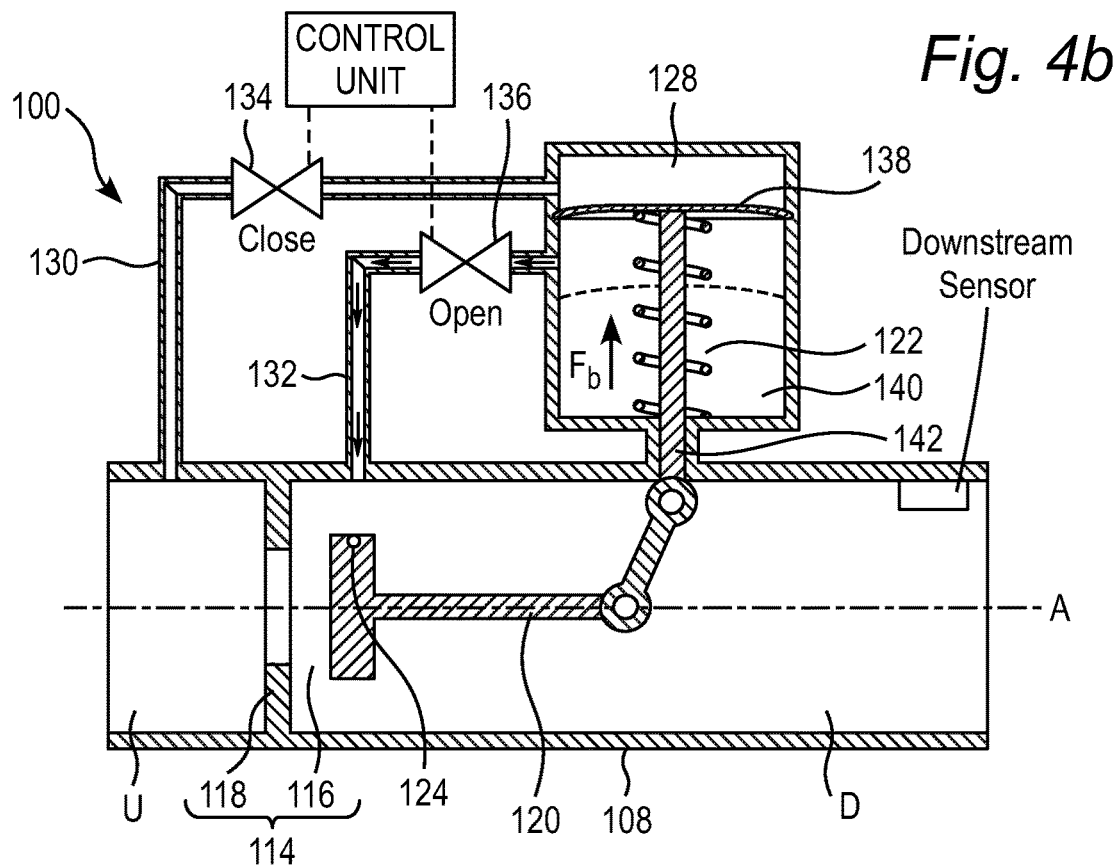

FIGS. 4a and 4b schematically show how the closing and opening functions of the valve 100 can be achieved. It may be noted that in FIGS. 4a and 4b one of the electronically controlled valves 134, 136 can be opened while the other one is closed. However, the valve 100 may also be operated with a by-passing mode in which both electronically controlled valves 134 and 136 may be opened. This will be exemplified further below.

As illustrated in FIG. 4a, the closing function of the valve 100 is achieved by increasing the volume inside the variable volume chamber 128. The volume inside the variable volume chamber 128 is increased by opening the electronically controlled valve 134 which regulates the first controllable conduit 130. By opening the valve 134, fluid is supplied from the high pressure side U of the valve body 108 to the variable volume chamber 128. Meanwhile, the electronically controlled valve 136, which regulates the second controllable conduit 132 is kept closed. The volume increase in the variable volume chamber 128 triggers a movement of the separating member 138 and the mechanical member 142. As the mechanical member 142 is operationally connected to the plug 116, the movement is transferred to the plug 116, such that the plug 116 is moved in a direction against the seat 118 and the valve 100 is closed. The volume increase in the variable volume chamber 128 also compresses the spring-action member 122, such that an inherent spring biasing force $F_b$ is stored inside the spring action member 122. Thus, the fluid flowing in from the high pressure side U generates a greater force on the separating member 138 than the counteracting force of the spring 122.

Now referring to FIG. 4b, which schematically shows how the opening function of the valve 100 can be achieved. FIG. 4b shows that the opening function of the valve 100 is achieved by decreasing the fluid volume inside the variable volume chamber 128. To decrease the volume inside the variable volume chamber 128, the first electronically controlled valve 134 located on the first controllable circuit 130 is closed, while the electronically controlled valve 136 on the second controllable conduit 132 is opened. Since a higher pressure is present in the variable volume chamber 128 than on the low pressure side D of the valve body 108, by opening the second controllable conduit 132, an amount of fluid is diverted from the variable volume chamber 128 to the low pressure side D of the valve body 108. As the pressure inside the variable volume chamber 128 decreases, the inherent spring action force $F_b$ in the spring action member 122 is released and the spring-action force $F_b$ moves the separating member 138 to an equilibrium position, in which both the separating member 138 and the valve 100 are in equilibrium and stationary.

In the closing and the opening function, the electronically controlled valves 134, 136 located on the controllable conduits 130, 132 may be operated selectively and for different durations in time. Consequently, the degree of opening of the valve 100 is dependent on the actual/corresponding fluid volume inside the variable volume chamber 128.

In use, a maximum operational flow is first applied to the valve and by using the combination of a calibration scale and the measured pressure differential at that maximum operational flow rate, the optimal maximum separation of the plug 116 and seat 118 is identified and the valve 100 adjusted to restrict the maximum separation to that optimum. The movement of the valve closing member 116 between a closed position and the optimum maximum opening position in the normal operation of the valve can be achieved in response to an external control signal.

As mentioned previously, a by-pass mode may be used for the valve 100 in FIGS. 4a and 4b and also for other embodiments of the inventive concept. Thus, purely for illustrating purposes, a practical example of how the function of the valve 100 in FIGS. 4a and 4b could be implemented in a fluid distribution system will now be presented. Thus, other modes of operation and/or in other contexts are also conceivable. The valve 100 is normally open, i.e. the valve closing member 116 is separated from the valve seat 118. Both the first and the second electronically controlled valves 134, 136 may be open, so that there is a by-pass flow from the upstream side U to the downstream side D via the first controllable conduit 130, the variable volume chamber 128 and the second controllable conduits 132. The spring 122 keeps the valve fully open. The spring 122 is strong enough to overcome the force of the pressure drop in the first and second controllable fluid conduits 130, 132, which with the by-pass function affect the separating member 138. When the temperature at a consumption point downstream of the valve increases and reaches a setting value in the BMS (Building Management System), the second controllable valve starts to close. The by-pass flow through the conduits 130, 132 decreases and the high pressure fluid from the upstream side U will provide a pressure on the separating member 138 to close the valve closing mechanism 114. The second electronically controllable valve 136 and the valve closing mechanism 114 will remain closed as long as the temperature at the consumption point does not go below the setting value. If the temperature at the consumption point decreases below the setting value, the controllable valve 136 will open again, thereby moving the valve closing member 116 away from the valve seat 118 to allow fluid flow through the valve in order to increase the temperature at the consumption point.

Figure 5:
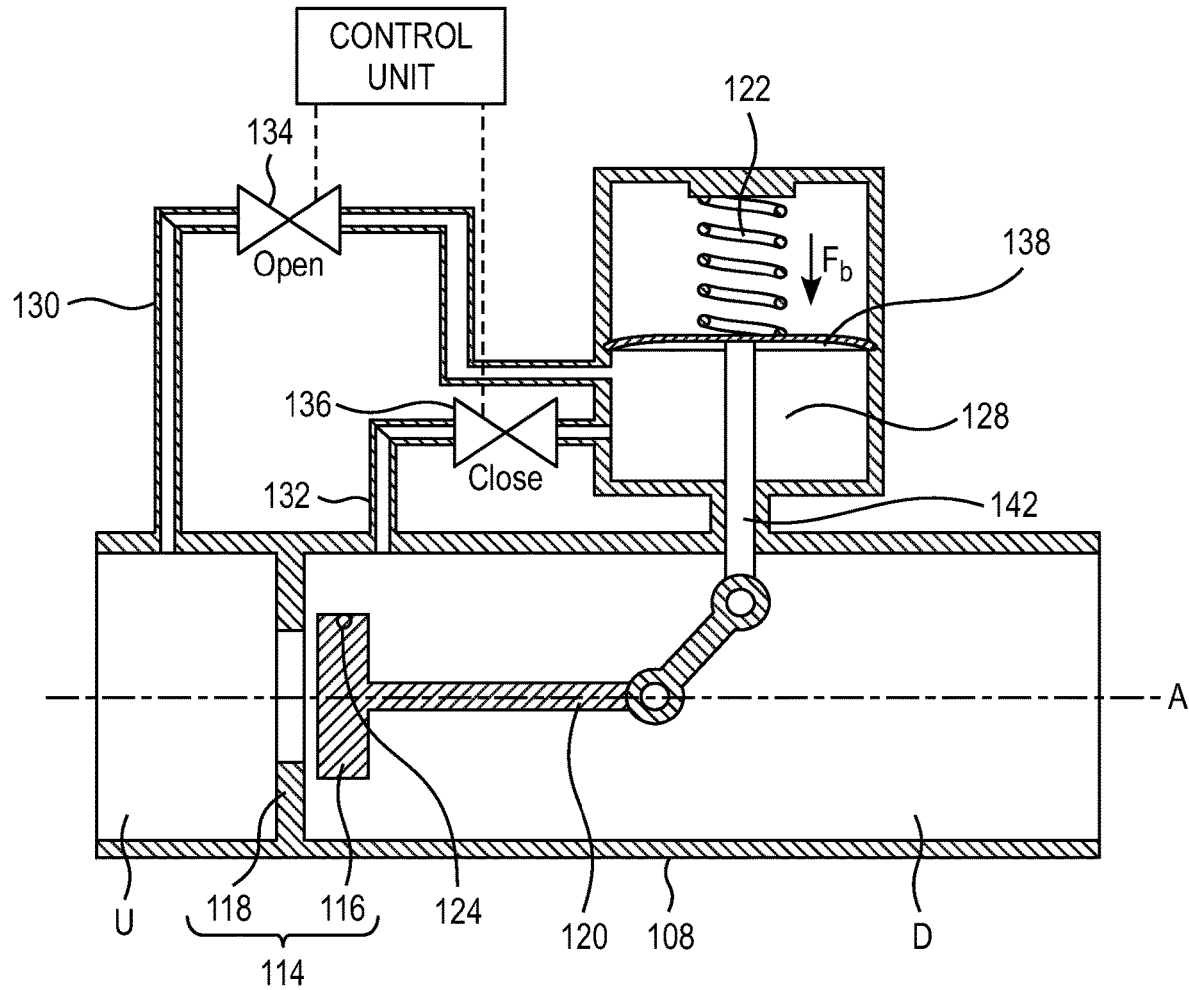
FIG. 5 is a schematic cross-sectional view of another exemplary embodiment of a spring-biased valve closing member according to the present invention.

FIG. 5 shows an exemplary embodiment of how the valve closing member 116 can be spring biased towards a normally closed position. As illustrated in FIG. 5, the valve closing member can be spring-biased such that it displaces the mechanical member 142 such that the plug 116 is urged against the seat 118. Thus, opening of the valve is achieved by allowing fluid to flow from the high pressure side U through the first controllable conduit 130 into the variable volume chamber 128, while keeping the valve 136 in the second controllable conduit closed. The inflow of fluid into the variable volume chamber 128 will, as in the previously illustrated embodiments, cause an increase of the variable volume chamber 128, which will press the separating member 138 so that the biasing force $F_b$ of the spring 122 is counteracted. As a result, the valve closing member 116 will move away from the valve seat 118.

Figure 6:
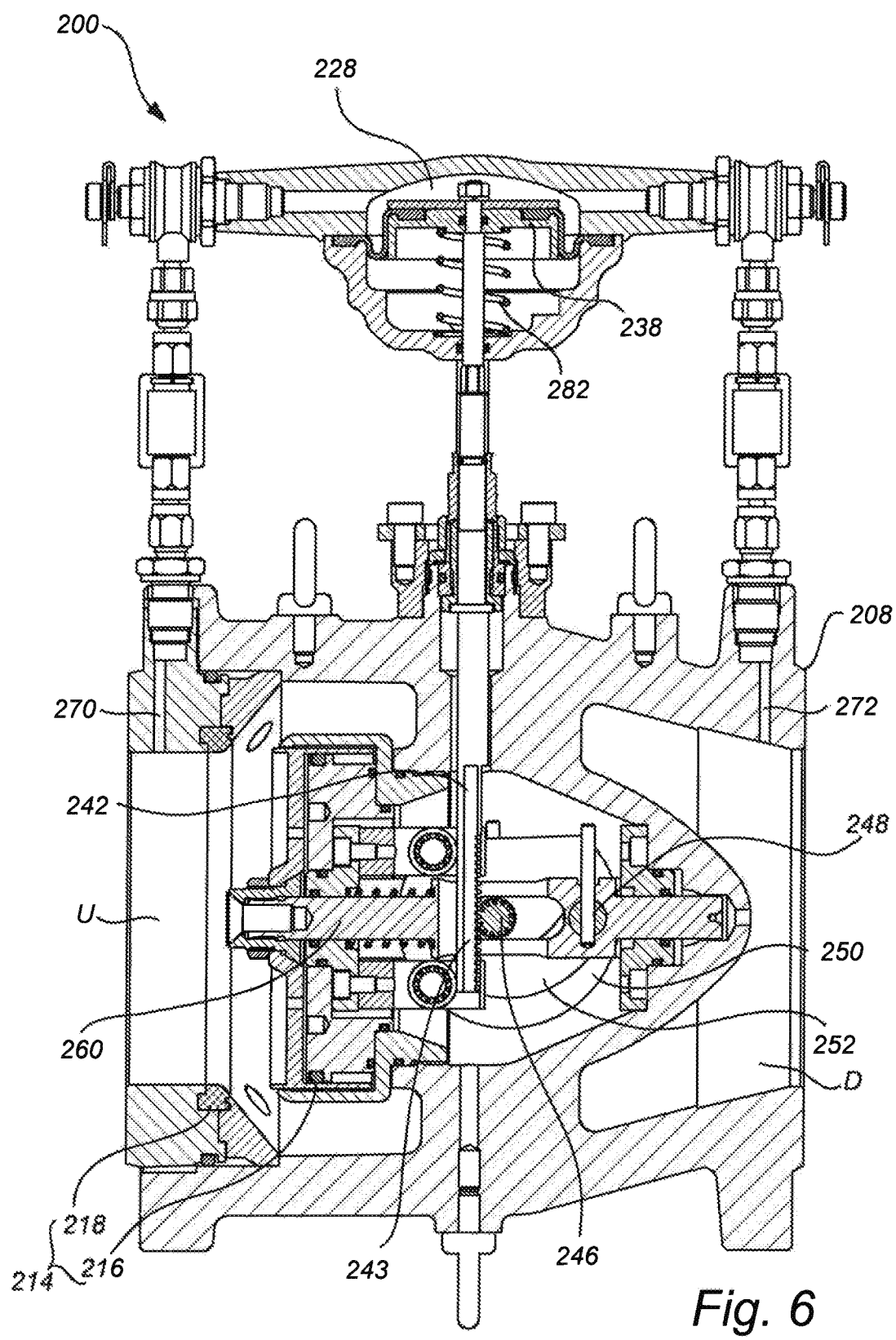
FIG. 6 is a cross-sectional view of an exemplary embodiment of the valve comprising an actuator with a variable volume chamber located outside a valve body.

FIG. 6 illustrates a cross section of the valve 200 in FIG. 1, in accordance with at least one exemplary embodiment. The valve 200 comprises a variable volume chamber 228 located outside a valve body 208. A valve closing mechanism 214 comprising a plug 216 and a seat 218 are arranged inside the valve body 208. The plug 216 is retained on a shaft 260 with an axis passing through the center of the plug 216.

A connecting rod 242 is arranged with one distal end in contact with a moveable separating member 238 of the variable volume chamber 228. The other distal end of the connecting rod 242 is arranged inside the valve body 208 and is provided with a toothed portion 243. In order to transform an axial movement of the connecting rod 242 to an axial movement of the plug 216, a motion converting arrangement is arranged inside the valve body 208.

For instance, the motion converting arrangement may comprise a pinion gear 246 and a cam follower assembly 248 such that the pinion gear 246 engages with the toothed portion 243 of the connecting rod 242. The pinion gear 246 is fixedly mounted to a cam plate 250 which incorporates a guide 252 for the cam follower assembly 248. The cam follower assembly 248 is fixedly mounted on the shaft 260 and the pinion gear 248 passes through a slot in the shaft 260 so as not to obstruct its axial movement. As the rod 242 moves axially, the pinion gear 248, through its engagement with the toothed portion 243, is forced to rotate and the cam plate 250 rotates with it. As the cam plate 250 rotates, the cam follower assembly 248 is forced to travel in the cam guide 252 carrying with it the shaft 260. The plug 216 carried on the shaft 260 is also forced to move axially whereby the separation distance between the plug 216 and seat 218 is adjusted.

A first controllable conduit or passageway 270 is provided for allowing the high pressure fluid on the upstream side U to be arranged in fluid communication with the variable volume chamber 228. A second controllable conduit or passageway 272 is provided for allowing the low pressure fluid on the downstream side D to be arranged in fluid communication with the variable volume chamber 228. The general operating principle is similar to that shown in FIGS. 4a and 4b. Thus, a spring 282 is provided for biasing the valve closing member 216 away from the seat 218, i.e. to a "normally open position". However, when the first controllable conduit 270 is open and the second controllable conduit 272 is closed, high pressure fluid will increase the volume of the variable volume chamber and press the separating member 238 downwardly against the force of the spring 282, thereby moving the valve closing member 216 in a direction towards the valve seat 218. Then, when the second controllable conduit 272 is opened and the first controllable conduit 270 is closed, the high pressure fluid in the variable volume chamber will, due to the differential pressure flow into the downstream side D where a lower pressure is present. This causes the valve closing member 216 to move away from the valve seat 218. It should be understood that other embodiments, the spring 282 could be arranged on the opposite side (above as seen in the drawing) of separating member 238 in order to bias the valve closing member towards a "normally closed position", in which case the ports to/from the first and second controllable conduits 270, 272 would be located below (as seen in the drawing) the separating member 238.

Figure 7:
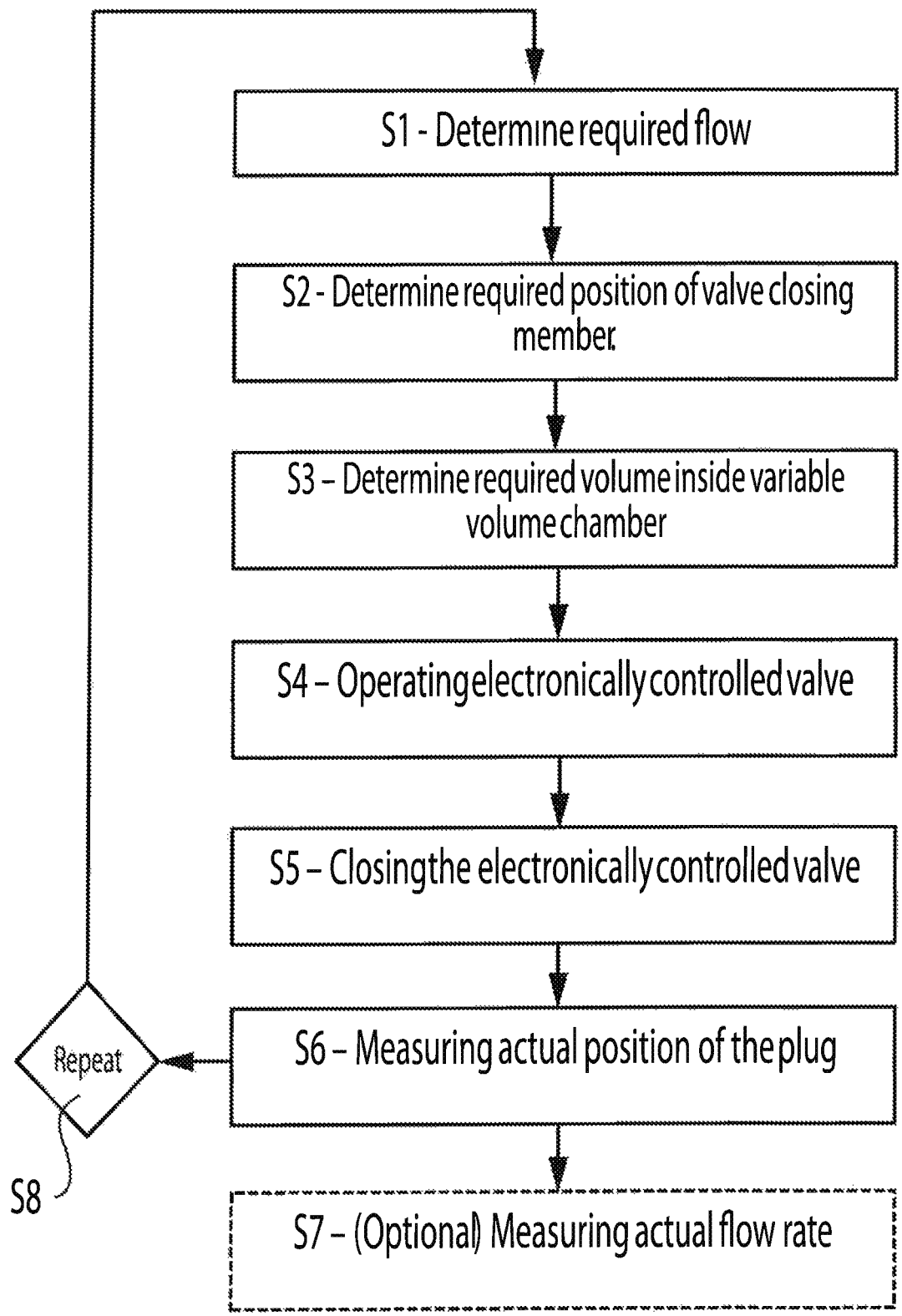
FIG. 7 is a flow chart of an exemplary method for regulating the flow rate through a valve according to the present invention.

FIG. 7 illustrates a flow diagram of an exemplary method for controlling a valve in a fluid conduit such that the flow rate through the valve or the pressure absorbed by the valve can be adjusted. The method includes the following steps:

In a first step S1, the required flow rate in the fluid conduit is determined. For instance, the required flow rate or differential pressure can be determined by a control unit which is connected to a BMS system, or by a sensor or a thermostat connected to the valve body.

In a second step S2, the required position of the valve closing member is determined. This step can be performed by a control unit that calculates the position of the valve closing member by any suitable means, such as by means of a temperature sensor, differential pressure sensor, electromagnetic sensor, BMS, etc.

In a third step S3, the required volume inside the variable volume chamber is determined. This step can be also be performed by a control unit, which determines the required volume inside the variable volume chamber based on predetermined relationships between the volume inside the variable volume chamber and the position of the valve closing member.

In a fourth step S4, the electronically controlled valve on the controllable conduits is operated, such that the required fluid amount is supplied to or diverted from the variable volume chamber, whereby the valve closing member is brought into the required position.

In a fifth step S5, the electronically controlled valve is closed when the required position of the valve closing member is achieved.

In a sixth step S6, the actual position of the valve closing member can be determined such that the degree of opening of the valve is determined.

Optionally and/or additionally, in a seventh step S7, the actual flow rate through or differential pressure across the valve is determined. To determine the actual flow rate, a differential pressure sensor or a flow meter can be used.

Optionally and/or additionally, in an eight step S8, a continuous position feedback loop may be performed in order to compare the actual position to the desired position. Any potential deviation between the actual position and the desired position can be determined, and iterative corrections of the position of the valve closing member can be carried out.

The skilled person will realize that the present invention is by no means limited to the described exemplary embodiments. For instance, the valve may also be provided with a balancing function and pressure ports for reading the differential pressure. The balancing function provides the possibility of regulating the max/min lift/flow/opening. Furthermore, measurements of the actual flow through the valve or the differential pressure over the valve can be captured through pressure ports to which a measuring unit can be connected to pressure measuring tool. A person confined with regulating the flow rates would then manually set the maximum and minimum flow restrictions.

The mere fact that certain measures are recited in mutually different dependent claims does not indicate that a combination of these measures cannot be used to advantage. Moreover, the expression "comprising" does not exclude other elements or steps. Other non-limiting expressions include that "a" or "an" does not exclude a plurality and that a single unit may fulfill the functions of several means. Any reference signs in the claims should not be construed as limiting the scope. Finally, while the invention has been illustrated in detail in the drawings and in the foregoing description, such illustration and description is considered to be illustrative or exemplary and not restrictive; the invention is not limited to the disclosed embodiments.

The invention claimed is:

1. A valve having a control function for regulating flow and/or pressure in a fluid conduit, the valve comprising:
   a fluid inlet and a fluid outlet,
   a seat,
   a valve closing member being movable between a closed position and an opened position for regulating fluid flow from the fluid inlet to the fluid outlet at a fluid flow regulating position, wherein the valve closing member is in the form of a valve stem attached to a plug, the plug configured to mate with the seat for obtaining said closed position,
   the valve having a high pressure side upstream of the fluid flow regulating position and a low pressure side downstream of the fluid flow regulating position, the valve closing member being arranged in the low pressure side, a variable volume chamber being operatively connected to the valve closing member, such that a change of volume of the chamber causes a change in position of the valve closing member,
   a first controllable conduit enabling said high pressure side to be in fluid communication with said variable volume chamber,
   a second controllable conduit enabling said low pressure side to be in fluid communication with said variable volume chamber, and
   a control unit for controlling the opening and closing of said first and second controllable conduits to change the volume of said variable volume chamber,
   wherein the plug of the valve closing member is located downstream of the seat and the valve stem is located downstream of the plug.

2. The valve according to claim 1, wherein
   the valve is adapted to transfer fluid from said high pressure side, via said first controllable conduit, to said variable volume chamber, and wherein
   the valve is adapted to transfer fluid from said low pressure side, via said second controllable conduit, to said variable volume chamber.

3. The valve according to claim 1, wherein the valve closing member is subject to a biasing force towards the closed position or towards the opened position, wherein either an increase or a decrease in volume of the variable volume chamber counteracts the biasing force.

4. The valve according to claim 1, wherein the variable volume chamber is partly defined by a moveable separating member, wherein the separating member is connected to the valve closing member.

5. The valve according to claim 4, wherein the separating member separates the variable volume chamber from a compartment, the variable volume chamber being connected to said high pressure side of the valve and the compartment being connected to said low pressure side of the valve.

6. The valve according to claim 1, wherein the control unit is operatively connected to, or comprises an electronically controlled valve device for selectively and separately opening the first and second controllable conduits.

7. The valve according to claim 6, wherein the electronically controlled valve device comprises a glider with two openings, such that a displacement of the glider is adapted to open one of the controllable conduits at a time.

8. The valve according to claim 6, wherein the control unit is adapted to receive an input signal from a Building Management System (BMS), to translate the signal into a required opening of the electronically controlled valve device, and to actuate a displacement of the electronically controlled valve device.

9. The valve according to claim 8, wherein the valve further comprises means for determining an actual position of the valve closing member, and to provide data on the actual position as input to the control unit or the BMS.

10. The valve according to claim 1, comprising a valve body in which said valve closing member is movable, wherein said variable volume chamber is located outside the valve body.

* * * * *